United States Patent
Mainka et al.

(10) Patent No.: US 11,946,234 B2
(45) Date of Patent: Apr. 2, 2024

(54) CONTROL VALVE FOR AT LEAST ONE SANITARY FITTING HAVING A DIAPHRAGM VALVE AND A MULTI-PORT VALVE

(71) Applicant: GROHE AG, Hemer (DE)

(72) Inventors: David Mainka, Iserlohn (DE); Janik Buchmüller, Schwerte (DE); Sebastian Kukla, Bochum (DE)

(73) Assignee: GROHE AG, Hemer (DE)

( * ) Notice: Subject to any disclaimer, the term of this patent is extended or adjusted under 35 U.S.C. 154(b) by 75 days.

(21) Appl. No.: 17/794,778

(22) PCT Filed: Sep. 28, 2020

(86) PCT No.: PCT/EP2020/077077
§ 371 (c)(1),
(2) Date: Jul. 22, 2022

(87) PCT Pub. No.: WO2021/148151
PCT Pub. Date: Jul. 29, 2021

(65) Prior Publication Data
US 2023/0110583 A1  Apr. 13, 2023

(30) Foreign Application Priority Data

Jan. 24, 2020 (DE) ..................... 10 2020 101 691.3

(51) Int. Cl.
*E03C 1/02* (2006.01)
*F16K 11/07* (2006.01)
(Continued)

(52) U.S. Cl.
CPC ............ *E03C 1/023* (2013.01); *F16K 11/074* (2013.01); *F16K 31/3855* (2013.01)

(58) Field of Classification Search
CPC ..... E03C 1/023; F16K 11/074; F16K 31/3855
See application file for complete search history.

(56) References Cited

U.S. PATENT DOCUMENTS 1,841,456 A * 1/1932 Shand ........................ E03D 3/04
  251/44
2,406,259 A * 8/1946 Russell ...................... E03D 3/04
  251/40

(Continued)

FOREIGN PATENT DOCUMENTS

DE  20 2018 105 509  12/2018
EP     3 147 546   3/2017
EP     3 599 399   1/2020

OTHER PUBLICATIONS

International Search Report dated Dec. 7, 2020, in International (PCT) Application No. PCT/EP2020/07 7077 , with English translation.

*Primary Examiner* — Kevin R Barss
(74) *Attorney, Agent, or Firm* — Wenderoth, Lind & Ponack, L.L.P.

(57) ABSTRACT

A control valve for at least one sanitary fitting that contains a body having at least one inlet (3) for a liquid; a diaphragm valve for opening and closing a flow channel of the control valve, the diaphragm valve having a diaphragm and a counterpressure chamber connected to the at least one inlet, and a pilot orifice being formed in the diaphragm, which pilot orifice connects the counterpressure chamber to the flow channel; a multi-port valve disposed downstream of the diaphragm valve and having a plurality of outlets for the liquid; and a controller for controlling the diaphragm valve and the multiport valve, the controller containing a control rod extending through the pilot orifice of the diaphragm, wherein the control rod can be adjusted in a longitudinal direction for controlling the diaphragm valve and can be rotated for controlling the multiport valve.

10 Claims, 2 Drawing Sheets

Figure 1:
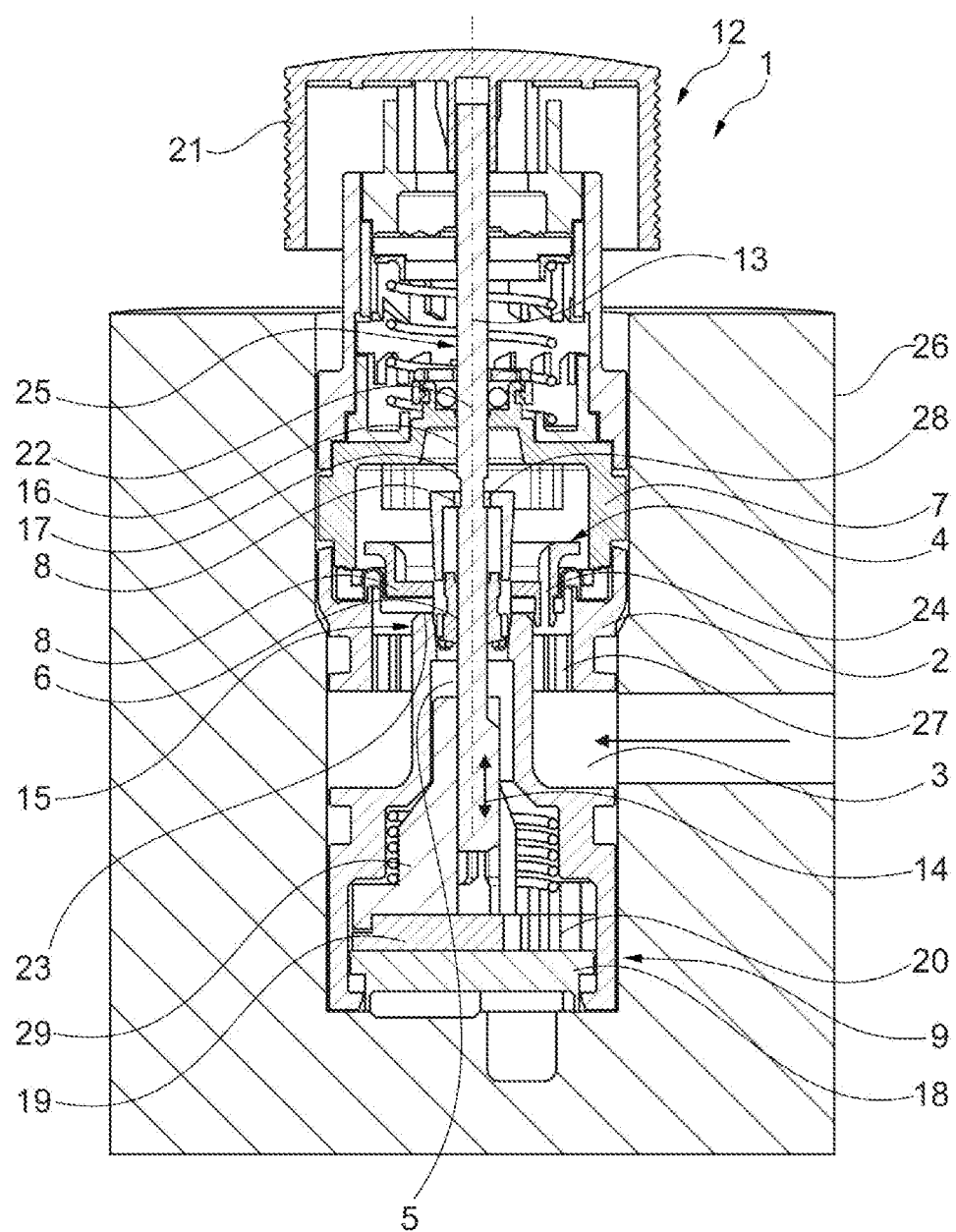

(51) Int. Cl.
*F16K 11/074* (2006.01)
*F16K 31/385* (2006.01)

(56) References Cited

U.S. PATENT DOCUMENTS

| | | | | |
|---|---|---|---|---|
| 3,902,521 | A * | 9/1975 | Keller | F16K 21/06 |
| | | | | 251/35 |
| 5,725,197 | A * | 3/1998 | Hill | E03D 3/04 |
| | | | | 251/44 |
| 6,810,904 | B2 * | 11/2004 | Figueiredo | E03D 9/14 |
| | | | | 137/433 |
| 6,848,668 | B2 * | 2/2005 | Figueiredo | E03D 1/32 |
| | | | | 181/234 |

* cited by examiner

CONTROL VALVE FOR AT LEAST ONE SANITARY FITTING HAVING A DIAPHRAGM VALVE AND A MULTI-PORT VALVE

This invention relates to a control valve for a sanitary fitting. Such sanitary fittings are used to provide a liquid on demand, for instance at showers, bathtubs, sinks or washbasins.

Control valves can be used, for instance, to supply liquid to different spray plates of the sanitary fitting, such as a showerhead of a shower. The spray plates can be used to dispense the liquid through the sanitary fitting in different types of spray patterns, for instance, full jets, rain jets, massage jets, etc. Furthermore, control valves can also be used to supply the liquid to different liquid outlets of a sanitary fitting. For instance, the liquid can be selectively routed through the control valve to the tabs of a bathtub and/or a hand shower. Among the disadvantages of the known control valves is their size that requires a lot of space and the fact that they are not easy or intuitive to operate.

Therefore, the invention addresses the problem of solving at least a part of the issues described with reference to the prior art and, in particular, of providing a control valve for a sanitary fitting, which is particularly compact in size and easy to operate.

These problems are solved by a control valve according to the features of the independent claim. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A control valve for a sanitary fitting having at least the components listed below contributes to solving the problem:
  a body having at least one inlet for a liquid;
  a diaphragm valve for opening and closing a flow channel of the control valve, wherein the diaphragm valve has a diaphragm and a counterpressure chamber connected to the at least one inlet, and wherein a pilot orifice is formed in the diaphragm, which pilot orifice connects the counterpressure chamber to the flow channel;
  a multi-port valve disposed downstream of the diaphragm valve and having a plurality of drains for the liquid; and
  a controller for controlling the diaphragm valve and the multiport valve, wherein the controller comprises a control rod extending through the pilot orifice of the diaphragm, and wherein the control rod can be adjusted in a longitudinal direction for controlling the diaphragm valve and wherein the control rod can be rotated for controlling the multiport valve.

The control valve can be disposed inside a sanitary fitting or hose lines and/or pipelines to a sanitary fitting, for instance. Sanitary fittings are used to provide a liquid on demand, in particular showers, bathtubs, sinks or washbasins. In particular, the control valve can be at least partially concealed or at least partially located in a wall or a support.

The control valve comprises a body having at least one inlet, which can be used to connect the control valve to a liquid source, for instance a public liquid mains. A mixing valve or a mixing cartridge can be connected upstream of the at least one inlet, which mixing valve or mixing cartridge can be used to mix a cold water having a cold-water temperature and a hot water having a hot-water temperature to form a mixed water having a desired mixed-water temperature. The cold-water temperature is in particular at most 25° C. (Celsius), preferably 1° C. to 25° C., particularly preferably 5° C. to 20° C. and/or the hot-water temperature is in particular at most 90° C., preferably 25° C. to 90° C., particularly preferably 55° C. to 65° C. The body can be of multi-part design. Furthermore the body can at least partially consist of plastic and/or metal, such as brass.

The liquid flowing in via the at least one inlet can be routed through the body to a diaphragm valve. To this end, at least one inlet channel and/or at least one inlet chamber can be formed in the body. The diaphragm valve is used to open and close a flow channel of the control valve, through which flow channel the liquid can be routed to a multi-port valve of the control valve. The multi-port valve is located downstream of the diaphragm valve and has a plurality of outlets for the liquid. For instance, the multi-port valve may have 2 to 10, preferably 2 to 5, outlets, or more preferably 2 or 3 outlets. For instance, each of the outlets may be connected to a sepa-rate spray plate of the sanitary fixture. The diaphragm valve comprises a diaphragm and a counterpressure chamber connected to the at least one inlet. The liquid can flow from the inlet channels and/or inlet chambers of the body into the counterpressure chamber of the diaphragm valve via a compensation hole in the diaphragm of the diaphragm valve and/or other components of the control valve, for instance the body, such that the liquid has the same liquid pressure on both sides of the diaphragm. Because the diaphragm delimits the counterpressure chamber with a larger area than the at least one inlet channel and/or the at least one inlet chamber, the force on the diaphragm resulting from the liquid pressure of the liquid in the counterpressure chamber is greater than the force resulting from the liquid pressure of the liquid in the at least one inlet channel and/or the at least one inlet chamber. In this way, the diaphragm is pressed onto a valve seat closing the diaphragm valve. A pilot orifice is formed in the diaphragm to connect the counterpressure chamber to the flow channel. The pilot orifice can, for instance, be formed as a hole in the diaphragm.

The diaphragm valve and the multi-port valve can be controlled by one (common and/or single) controller. The controller comprises at least one control rod extending through the pilot orifice of the diaphragm. The control rod is in particular rod-shaped, pin-shaped and/or (largely) straight. Furthermore, the control rod can be designed in the manner of a spindle, for instance. Furthermore, a user of the control valve can adjust the control rod in a longitudinal direction to control the diaphragm valve and rotate the former to control the multi-port valve. For this purpose, at least one of the two longitudinal ends of the control rod can extend out of the body. A user can open or close the diaphragm valve, for instance, by a pressure actuation of the control rod. To this end, the user can move the control rod for instance from a closed position, in which the diaphragm valve is closed, and an open position, in which the diaphragm valve is open, in a longitudinal direction and vice versa. In the closed position, the control rod can be moved further into the body than in the open position. The control rod can be adjusted and/or locked (similar to a ballpoint pen refill) in the closed position and/or the open position. The longitudinal direction of the control rod extends in particular in parallel to a longitudinal axis of the control rod. Furthermore, the control rod can be rotated in particular about its longitudinal axis. The longitudinal axis can therefore coincide with an axis of rotation of the control rod. The control rod is coupled (directly or indirectly) to the multi-port valve in such a way that the rotation of the control rod about the axis of rotation actuates or controls the multi-port valve. By turning the control rod, a user can determine the outlet or outlets of the multi-port valve through which the liquid drains. In addition, the rotation of the control rod can be used to control the flow rate at which the liquid is discharged and the outlet of the multi-port valve that is used for discharging. The control rod therefore permits the integration of functions of a pressure valve and a so-called AquaDimmer in a (single) control valve in a space-saving manner. In addition, it is particularly easy to operate the control valve by pressing and turning the control rod.

The diaphragm valve may be located at a first longitudinal end of the flow channel. In this way, the first longitudinal end of the diaphragm valve can be used to open or close the flow channel. The first longitudinal end of the flow channel is, in particular, that longitudinal end of the flow channel which is disposed upstream. In that way, the first longitudinal end of the flow channel can form a valve seat for the diaphragm valve. The flow channel can be formed to be at least partially tubular.

The flow channel can connect the diaphragm valve to the multi-port valve. Among other things, this means that the liquid can flow via the flow channel to the multi-port valve when the diaphragm valve is open. Further, the control rod may extend from the diaphragm through the flow channel towards the multi-port valve.

A sealing element can be disposed on a circumferential surface of the control rod, which sealing element can be used by the control rod to close the pilot orifice of the diaphragm. The sealing element extends along the circumference, in particular 360 around the control rod. For this purpose, the sealing element can be in particular annular. For instance, the sealing element can be formed like a circumferential collar or an O-ring. In addition, the sealing element may be at least partially made of plastic or rubber. Furthermore, the sealing element can be firmly connected to the control rod. In this way, the control rod can be used to adjust the sealing element, particularly in the longitudinal direction. The pilot orifice is formed between the control rod and the diaphragm, in particular as an annular gap. When the control rod is in the closed position, the sealing element rests against the pilot orifice of the diaphragm to close the latter.

This prevents liquid from flowing from the counterpressure chamber into the control channel. However, when the control rod is in the open position, the sealing element is lifted off the pilot orifice, permitting liquid to flow from the counterpressure chamber into the flow channel via the pilot orifice.

The multi-port valve may have a static disk and a dynamic disk movably disposed on the static disk. The static disk and/or the dynamic disk can in particular be at least partially made of a plastic or a ceramic material. Furthermore, the static disk and/or the dynamic disk are in particular flat and/or (largely) round. Furthermore, the static disk and/or the dynamic disk can be disposed in the body. In particular, the static disk cannot be moved relative to the control valve and/or the body. During the motion of the dynamic disk, the dynamic disk slides in particular on the static disk or on a surface of the static disk.

The control rod can rotate the dynamic disk. For this purpose, the dynamic disk is coupled in particular (directly or indirectly) to the control rod. An axis of rotation of the dynamic disk extends in particular in parallel to or coaxially with the axis of rotation of the control rod.

The dynamic disk may have at least one control aperture. The control aperture is designed in particular in the manner of a hole in the dynamic disk. In particular, the control aperture is not concentric with the axis of rotation of the dynamic disk, such that the control aperture can be moved into different areas of the static disk when the dynamic disk is rotated. Furthermore, the control aperture extends completely through the dynamic disk, particularly in the longitudinal direction of the control rod. The liquid can be routed through the flow channel, in particular to the control aperture of the dynamic disk. Due to the motion of the dynamic disk, the liquid can be selectively routed to different areas of the static disk.

The control aperture connects the flow channel to at least one of the outlets, depending on the position of the dynamic disk. The outlets of the diaphragm valve are designed, in particular, in the manner of apertures in the static disk. A connection between the flow channel and at least one of the outlets is established in particular when the control aperture of the dynamic disk is at least partially aligned with at least one of the outlets or covers at least one of the outlets, in particular in the longitudinal direction of the control rod or in parallel to an axis of rotation of the dynamic disk.

The control rod may be connected to a push button. In particular, the push button is located outside the body and/or can be operated by a user of the control valve.

The push button can be used to longitudinally adjust the control rod and rotate it about an axis of rotation. By pressing the push button, the control rod for controlling the diaphragm valve in particular can be adjusted in the longitudinal direction. By turning the push button, in particular the control rod for controlling the multi-port valve can be rotated.

Figure 2:
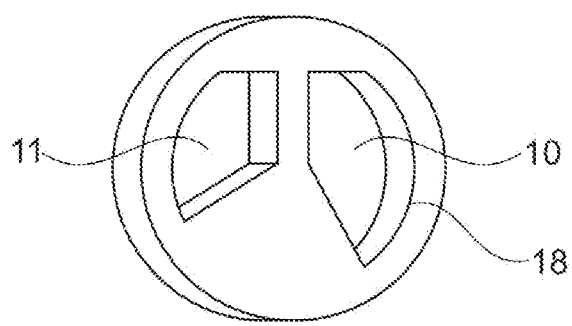
Figure 3:
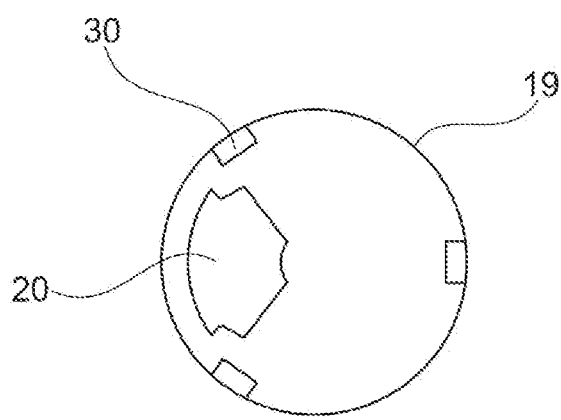

The invention and the technical environment are explained in more detail below with reference to the figures. It should be noted that the figures show a particularly preferred embodiment variant of the invention, but the invention is not limited thereto. The same reference signs are used for the same components in the figures. In an exemplary and schematic manner FIG. 1 shows a sectional view of a control valve;
FIG. 2 shows a static disk of the control valve; and
FIG. 3 shows a dynamic disk of the control valve.

FIG. 1 shows a sectional view of a control valve 1. There, the control valve 1 is disposed in a carrier 26 and has a body 2 having an inlet 3, via which a liquid can be supplied to the control valve 1. A diaphragm valve 4 having a diaphragm 6 is disposed inside the body 2. The liquid flows from the inlet 3 into an annular inlet chamber 27 and from there to the diaphragm valve 4. There, the liquid flows through a compensation hole 24 of the diaphragm 6 into a counterpressure chamber 7. The counterpressure chamber 7 is located on a side of the diaphragm 6 opposite from the inlet chamber 27. When the diaphragm valve 4 is closed, the liquid pressures in the inlet chamber 27 and in the counterpressure chamber 7 are identical. Because the diaphragm 6 delimits the counterpressure chamber 7 with a larger area than the inlet chamber 27, the force on the diaphragm 6 resulting from the liquid pressure of the liquid in the counterpressure chamber 7 when the diaphragm valve 4 is closed is greater than the force resulting from the liquid pressure of the liquid inside the inlet chamber 27. In this way, the diaphragm 6 is pressed onto an annular valve seat 23 formed at a first longitudinal end 15 of a flow channel 5.

When the diaphragm valve 4 is closed, no liquid can flow into the flow channel 5.

In FIG. 1, however, the diaphragm valve 4 is shown in an open position, in which the diaphragm 6 is lifted off the annular valve seat 23 (in this case, vertically upwards) to open the flow channel 5 of the control valve 1. For this purpose, the diaphragm 6 is movably disposed in the body 2. In the open state of the diaphragm valve 4 or of the diaphragm 6, the liquid can flow from the inlet chamber 27 into the flow channel 5 via the valve seat 23. The control valve 1 has a controller 12 for opening and closing the diaphragm valve 4. The controller 12 comprises a control rod 13 extending through a pilot orifice 8 of the diaphragm 6. The control rod 13 is connected to a push button 21, which a user of the control valve 1 can use to adjust the control rod 13 in a longitudinal direction 14 between a closed position and an open position 25 of the con-trot rod 13 (shown here) for controlling the diaphragm valve 4. The longitudinal direction 14 extends in parallel to an axis of rotation 22 of the control rod 13. The control rod 13 can be adjusted, for instance latched, by the push button 21, in particular either in the closed position or in the open position 25. For this purpose, the push button 21 is spring-mounted in the embodiment variant shown here. An annular sealing element 17 is disposed on a circumferential surface 16 of the control rod 13, which annular sealing element in the closed position of the control rod 13 rests against the pilot orifice 8 and closes an annular gap 28 between the control rod 13 and the diaphragm 6, preventing liquid from flowing from the counterpressure chamber 7 into the flow channel 5 via the pilot orifice 8 or the annular gap 28. In the open position 25 of the control rod 13 shown here, however, the sealing element 17 is lifted off the pilot orifice 8 of the diaphragm 6 (vertically upwards), for the liquid to flow from the counterpressure chamber 7 into the flow channel 5 via the annular pilot orifice 8 of the diaphragm 6 or via the annular gap 28. This causes the liquid pressure in the counterpressure chamber 7 to drop, lifting the diaphragm 6 off the valve seat 23.

In the open state of the diaphragm valve 4, the liquid flows to a multi-port valve 9 via the flow channel 5. The multi-port valve 9 is also disposed inside the body 2 and comprises a static disk 18 secured to the body 2 and a dynamic disk 19 disposed on the static disk 18. The dynamic disk 19 is connected to the control rod 13 via a driver 29, such that a user can rotate the dynamic disk 19 on the static disk 18 via the push button 21 and the control rod 13. The liquid first flows via the flow channel 5 to a control aperture 20 of the dynamic disk 19. In the longitudinal direction 14, the control aperture 20 extends completely through the dynamic disk 19. Depending on the rotational position of the dynamic disk 19, the control aperture 20 is at least partially aligned with a first outlet 10 and/or the second outlet 11 of the static disk 18 shown in FIG. 2.

The outlets 10, 11 also extend completely through the static disk 18 in the longitudinal direction 14. If the control aperture 20 of the dynamic disk 19 is at least partially aligned with the first outlet 10 of the static disk 18, the liquid can at least partially drain through the first outlet 10. If the control aperture 20 of the dynamic disk 19 is at least partially aligned with the second outlet 11 of the static disk 18, the liquid can at least partially drain through the second outlet 11. The more the control aperture 20 of the dynamic disk 19 intersects or is aligned with one of the two outlets 10, 11, the greater the volumetric flow rate of the liquid that drains via the re-spective outlets 10, 11. For instance, the dynamic disk 19 can be rotated by 150° on the static disk 18. The static disk 18 and the dynamic disk 19 may be configured such that, at a rotation angle of 0° to 120° of the dynamic disk 19, a volumetric flow of the liquid of 3 to 9 l/min (liters per minute) is supplied to the first outlet 10. Furthermore, the static disk 18 and the dynamic disk 19 can be designed in such a way that at a rotation angle of 120° to 150° of the dynamic disk 19, a changeover to the second outlet 11 occurs, such that the liquid is only routed to the second outlet 11. From the first outlet 10 and the second outlet 11, the liquid can be routed to different spray plates of a sanitary fitting, for instance.

FIG. 2 shows a top view of the static disk 18 with the first outlet 10 and the second outlet 11. In addition, FIG. 3 shows a top view of the dynamic disk 19 with the control aperture 20. The dynamic disk 19 has recesses 30, with which the driver 29 shown in FIG. 1 engages, such that the driver 29 is connected to the dynamic disk 19 in a form-fitting manner.

This invention permits a control valve for a sanitary fitting to be designed to be particularly compact and easy to operate.

LIST OF REFERENCE NUMERALS 1 control valve
2 body
3 inlet
4 diaphragm valve
5 flow channel
6 diaphragm
7 counterpressure chamber
8 pilot orifice
9 multipart valve
10 first outlet
11 second outlet
12 controller
13 control rod
14 longitudinal direction
15 first longitudinal end
16 circumferential surface
17 sealing element
18 static disk
19 dynamic disk
20 control aperture
21 push button
22 axis of rotation
23 valve seat
24 compensation hole
25 open position
26 support
27 inlet chamber
28 annular gap
29 driver
30 recess

The invention claimed is:
1. A control valve (1) for at least one sanitary fitting, comprising at least:
  a body (2) having at least one inlet (3) for a liquid;
  a diaphragm valve (4) for opening and closing a flow channel (5) of the control valve (1), wherein the diaphragm valve (4) has a diaphragm (6) and a counterpressure chamber (7) connected to the at least one inlet (3), and wherein a pilot orifice (8) is formed in the diaphragm (6), which pilot orifice connects the counterpressure chamber (7) to the flow channel (5);
  a multi-port valve (9) disposed downstream of the diaphragm valve (4) and having a plurality of outlets (10, 11) for the liquid; and
  a controller (12) for controlling the diaphragm valve (4) and the multiport valve (9), wherein the controller (12) comprises a control rod (13) extending through the pilot orifice (8) of the diaphragm (6), wherein the control rod (13) can be adjusted in a longitudinal direction (14) for controlling the diaphragm valve (4) and can be rotated for controlling the multiport valve (9).

2. The control valve (1) according to claim 1, wherein the diaphragm valve (4) is disposed on a first longitudinal end (15) of the flow channel (5).

3. The control valve (1) according to claim 1, wherein the flow channel (5) connects the diaphragm valve (4) to the multi-port valve (9).

4. The control valve (1) according to claim 1, wherein a sealing element (17) is disposed on a circumferential surface (16) of the control rod (13), which sealing element can be used by the control rod (13) to close the pilot orifice (8) of the diaphragm (6).

5. The control valve (1) according to claim 1, wherein the multi-port valve (9) comprises a static disk (18) and a dynamic disk (19) movably disposed on the static disk (18).

6. The control valve (1) according to claim 5, wherein the control rod (13) can rotate the dynamic disk (19).

7. The control valve (1) according to claim 6, wherein the push button (21) can be used to longitudinally (14) adjust the control rod (13) and rotate it about an axis of rotation (22).

8. The control valve (1) according to claim 5, wherein the dynamic disk (19) has at least one control aperture (20).

9. The control valve (1) according to claim 8, wherein the control aperture (20) connects the flow channel (5) to at least one of the outlets (10, 11) depending on the position of the dynamic disk (19).

10. The control valve (1) according to claim 1, wherein the control rod (13) is connected to a push button (21).

* * * * *